United States Patent
Flaks

(10) Patent No.: US 11,074,250 B2
(45) Date of Patent: Jul. 27, 2021

(54) TECHNOLOGIES FOR IMPLEMENTING ONTOLOGICAL MODELS FOR NATURAL LANGUAGE QUERIES

(71) Applicant: OWOX Limited, Nicosia (CY)

(72) Inventor: Vladyslav Flaks, Dnipro (UA)

(73) Assignee: OWOX Limted, Nicosia (CY)

( * ) Notice: Subject to any disclaimer, the term of this patent is extended or adjusted under 35 U.S.C. 154(b) by 178 days.

(21) Appl. No.: 15/981,506

(22) Filed: May 16, 2018

(65) Prior Publication Data

US 2018/0373753 A1    Dec. 27, 2018

Related U.S. Application Data

(60) Provisional application No. 62/525,441, filed on Jun. 27, 2017.

(51) Int. Cl.
*G06F 16/00* (2019.01)
*G06F 40/00* (2020.01)
(Continued)

(52) U.S. Cl.
CPC .......... *G06F 16/243* (2019.01); *G06F 16/245* (2019.01); *G06F 16/248* (2019.01);
(Continued)

(58) Field of Classification Search
CPC .... G06F 40/30; G06F 16/243; G06F 16/2433; G06F 16/245; G06F 16/24522;
(Continued)

(56) References Cited

U.S. PATENT DOCUMENTS 6,513,031 B1 *   1/2003   Fries ................... G06F 16/2428
6,665,666 B1 * 12/2003   Brown ................ G06F 16/3338
(Continued)

FOREIGN PATENT DOCUMENTS

WO    WO2012040677 A1 *   3/2012

OTHER PUBLICATIONS

Howard W Beck et al., "Integrating natural language query processing and semantic data models", IEEE 1990, pp. 538-543.*
(Continued)

*Primary Examiner* — Srirama Channavajjala
(74) *Attorney, Agent, or Firm* — Ulmer & Berne LLP

(57) ABSTRACT

Technologies for enabling retrieval of stored information in response to natural language queries include an information retrieval server. The information retrieval server receives a request for information from a user in the form of a natural language query. The received natural language query is compared to various previously-generated semantic queries, each of which is associated with a Structured Query Language query. Based on the comparison, the information retrieval server determines the previously-generated semantic query that most closely matches the received natural language query. Thereafter, the Structured Query Language query associated with the determined semantic query is identified. The information retrieval server determines executes the identified Structured Query Language query to retrieve the information requested by the user. The retrieved information is presented to the user by the information retrieval server. Other embodiments are described and claimed.

3 Claims, 7 Drawing Sheets

(51) Int. Cl.
*G06F 16/242* (2019.01)
*G06F 16/248* (2019.01)
*G06F 16/245* (2019.01)
*G06F 16/36* (2019.01)
*G06F 16/33* (2019.01)
*G06F 16/332* (2019.01)
*G06F 16/9032* (2019.01)
*G06F 40/30* (2020.01)
*G06F 40/186* (2020.01)
*G06Q 10/06* (2012.01)

(52) U.S. Cl.
CPC ...... *G06F 16/3329* (2019.01); *G06F 16/3344* (2019.01); *G06F 16/367* (2019.01); *G06F 16/90332* (2019.01); *G06F 40/186* (2020.01); *G06F 40/30* (2020.01); *G06Q 10/067* (2013.01)

(58) Field of Classification Search
CPC .. G06F 16/24553; G06F 16/288; G06F 16/33; G06F 16/3329; G06F 16/3344; G06F 16/367; G06F 16/36; G06F 16/43; G06F 16/53; G06F 16/90332; G06F 16/248; G06F 40/186; G06F 40/20; G06Q 10/067
See application file for complete search history.

(56) References Cited

U.S. PATENT DOCUMENTS

| | | | | |
|---|---|---|---|---|
| 8,862,458 B2* | 10/2014 | Freising | ............ | G06F 16/3334 704/9 |
| 9,501,539 B2* | 11/2016 | Joshi | ............ | G06F 16/254 |
| 10,685,312 B2* | 6/2020 | B'Far | ............ | G06F 16/254 |
| 2006/0271353 A1* | 11/2006 | Berkan | ............ | G06F 40/289 704/9 |
| 2007/0118551 A1* | 5/2007 | Akkiraju | ............ | G06Q 10/06 |
| 2008/0172353 A1* | 7/2008 | Lim | ............ | G06F 16/24564 706/47 |
| 2009/0070103 A1* | 3/2009 | Beggelman | ............ | G06F 40/20 704/9 |
| 2009/0077051 A1* | 3/2009 | Edelstein | ............ | G06F 16/84 |
| 2009/0094216 A1* | 4/2009 | Hou | ............ | G06F 16/2452 |
| 2009/0112835 A1* | 4/2009 | Elder | ............ | F16K 15/16 |
| 2009/0292687 A1* | 11/2009 | Fan | ............ | G06N 5/04 |
| 2010/0185643 A1* | 7/2010 | Rao | ............ | G06F 16/242 707/759 |
| 2011/0320187 A1* | 12/2011 | Motik | ............ | G06F 40/295 704/9 |
| 2012/0259885 A1* | 10/2012 | Palla | ............ | G06F 16/367 707/769 |
| 2013/0111487 A1* | 5/2013 | Cheyer | ............ | G06F 40/279 718/102 |
| 2013/0198117 A1* | 8/2013 | Upadhyaya | ............ | G06N 5/02 706/12 |
| 2014/0201196 A1* | 7/2014 | Rais-Ghasem | ............ | G06F 16/9038 707/722 |
| 2014/0279677 A1* | 9/2014 | Grosset | ............ | G06Q 10/067 705/348 |
| 2014/0358890 A1* | 12/2014 | Chen | ............ | G06F 16/3329 707/710 |
| 2015/0058248 A1* | 2/2015 | Griggs | ............ | G06Q 10/00 705/342 |
| 2015/0331929 A1* | 11/2015 | El-Saban | ............ | G06F 16/285 707/739 |
| 2016/0140439 A1* | 5/2016 | Adderly | ............ | G06F 16/367 706/46 |
| 2016/0232426 A1* | 8/2016 | Wang | ............ | G06K 9/4652 |
| 2016/0342685 A1* | 11/2016 | Basu | ............ | G06F 16/367 |
| 2017/0161319 A1* | 6/2017 | Venkataraman | ............ | G06F 16/243 |
| 2017/0177715 A1* | 6/2017 | Chang | ............ | G06F 40/186 |

OTHER PUBLICATIONS

Min Huang et al., "Ontology-based semantic retrieval of XBRL data", International Conference on Business Computing and Global Informatization, 2011, pp. 363-366.*

Mary Ting et al., "Query Refinement for Ontology Information Extraction", Third International Conference on Information Retrieval and Knowledge Management, 2016, pp. 82-87.*

* cited by examiner

TECHNOLOGIES FOR IMPLEMENTING ONTOLOGICAL MODELS FOR NATURAL LANGUAGE QUERIES

CROSS REFERENCE TO RELATED APPLICATION

This application claims the benefit of U.S. Provisional Patent Application No. 62/525,441, filed on Jun. 27, 2017, the disclosure of which is hereby incorporated herein by reference in its entirety.

FIELD OF THE DISCLOSURE

Embodiments of the technologies described herein relate, in general, to retrieving and analyzing information from data storage in response to natural language queries. More particularly, the technologies described herein relate to using ontological models to enable the retrieval and analysis of information stored in data storage based on natural language queries received from users.

BACKGROUND

The amount of data accumulated by modern business continues to increase. Such data may come from a variety of data sources. In order to quickly get answers or generate reports for business decision makers (e.g., business owners, data analysis employees, etc.), modern businesses need new ways of reviewing and researching such data. Conventional systems that utilize arbitrary text queries do not take into account the semantics and meaning of the questions being asked by users. Such practices prevent conventional systems from efficiently, quickly, and accurately generating reports from data retrieved from multiple data sources. This is especially the case when such systems need to respond to a voluminous number of requests. Conventional systems also typically require operators to have specific training or knowledge.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
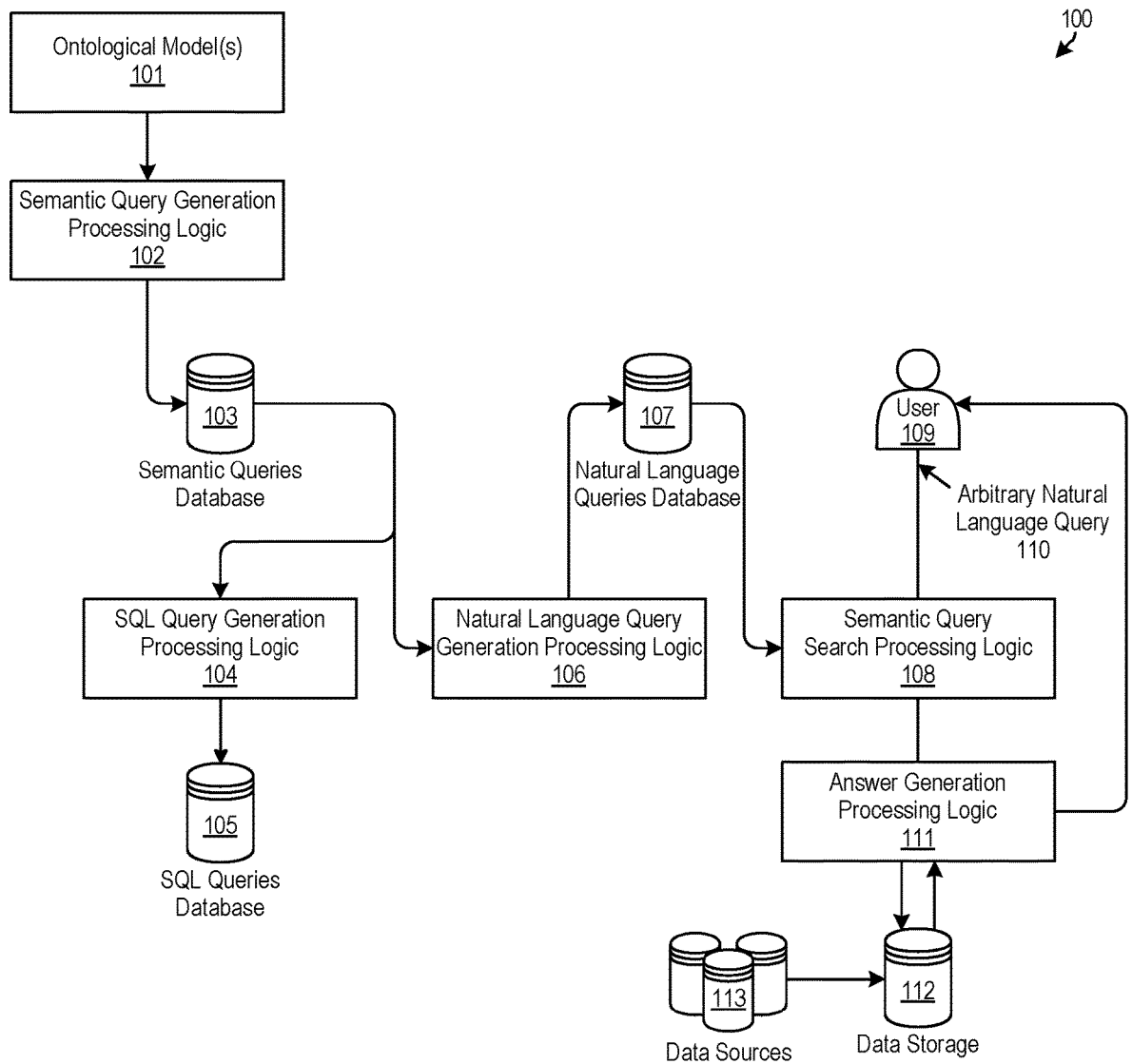
FIG. 1 is a simplified block diagram of at least one embodiment of a system for enabling retrieval and analysis of stored data in response to natural language queries.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware.

The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Referring now to FIG. 1, a system 100 for enabling the retrieval and analysis of information stored in data storage based on natural language queries received from a system user 109 (e.g., a system operator, employee, decision maker, etc.). To do so, the system 100 is configured to implement information retrieval technologies that utilize one or more ontological models 101 to generate semantic queries for retrieving information from one or more data sources 113 and/or data storages 112 (e.g., one or more data storage devices, databases, data stores, etc.). In operation, the system 100 is further configured to generate one or more SQL queries based on the generated semantic queries. In some embodiments, the system 100 generates and associates therewith a separate SQL query for each semantic query generated. Additionally, in some embodiments, the system 100 is configured to generate one or more natural language queries based on the generated semantic queries. After generation of the semantic queries and SQL queries, the system 100 is configured to receive a natural language query from the system user 109 requesting information (e.g., data, reports, responses, etc.). The natural language query may be a specific question asked, or a specific request made, by the system user 109 in natural or ordinary language (e.g., an unstructured question or request). The information requested can be information stored by and/or derived from the data source(s) 113 and/or the data storage(s) 112. Thereafter, the system 100 is configured to determine the previously-generated semantic query that most closely matches (or is within a reference confidence range) the natural language query received from the system user 109. The system 100 is configured to subsequently identify the SQL query associated with the semantic query determined to most closely match the received natural language query. Based on the identified SQL query, the system 100 is configured to retrieve the requested information from the data source(s) 113 and/or the data storage(s) 112, and in some embodiments, analyze or process the information to generate a response (e.g., a report, an answer, data, etc.) to the natural language query received from the system user 109. In some embodiments, the generated response can also be formatted or structured in natural language understandable or recognizable by the system user 109.

It should be appreciated that the technologies disclosed herein enable information to be retrieved in a reduced amount of time compared to the time required by conventional systems that utilize arbitrary text queries. Additionally, the technologies disclosed herein enable business decision makers (e.g., business owners, data analysis employees, etc.) to quickly get accurate answers and/or generate accurate reports from information originating from one or more data sources 113 and/or one or more data storages 112. The disclosed technologies enable such answers and reports to be generated even in response to a voluminous number of request. It should also be appreciated that specially trained users or technical experts are not required to operate or use the systems, methods, and the technologies disclosed herein. Rather, users of the technologies disclosed herein can easily retrieve data from multiple data sources 113 and/or data storages 112 using natural language requests.

As illustratively shown in FIG. 1, the system 100 may include semantic query generation processing logic 102, SQL query generation processing logic 104, natural language query generation processing logic 106, semantic query search processing logic 108, and answer generation processing logic 111. It should be appreciated that the semantic query generation processing logic 102, SQL query generation processing logic 104, natural language query generation processing logic 106, semantic query search processing logic 108, and/or answer generation processing logic 111 may be embodied as hardware logic, software logic, or any combination thereof. The system 100 may also include a semantic queries database 103 (or data store), a SQL queries database 105 (or data store) and, in some embodiments, a natural language queries database 107 (or data store). In some embodiments, one or more data storages 112 of the system 100 are configured to accumulate and store information collected or otherwise received from one or more data sources 113 for subsequent retrieval by other components of the system 100 (e.g., the semantic query generation processing logic 102, the semantic queries database 103, the SQL query generation processing logic 104, the SQL queries database 105, the natural language query generation processing logic 106, the natural language queries database 107, the semantic query search processing logic 108, answer generation processing logic 111, etc.).

As discussed herein, the system 100 can utilize an ontological model 101 to generate semantic queries for retrieving information from the one or more data sources 113 and/or the data storage 112. The ontological model 101 may be set up by the system user 109 based on the structure and semantics of business domain related data. It should be appreciated that the ontological model 101 may also be set up by a third party user (e.g., a developer, a service provider, etc.). The ontological model 101 describes objects, their properties and attributes, and how they are connected to each other. The ontological model 101 can be set up specifically for a particular project or a project can use a universal ontological model 101 that contains information about data commonly used in a certain domain.

In an example embodiment, the semantic query generation processing logic 102 originates and develops one or more semantic queries. More specifically, the semantic query generation processing logic 102 generates a plurality of possible semantic queries based on the ontological model 101, and stores the generated semantic queries in the semantic queries database 103. In some embodiments, the semantic query generation processing logic 102 generates and stores a list of possible semantic queries based on the ontological model 101. Each of the generated semantic queries stored in the semantic queries database 103 and/or each of the possible semantic queries included in the list can be associated or correlated to other data or queries of the system 100. It should be appreciated that the plurality of semantic queries stored in the semantic queries database 103 and/or listed can be changed. For example, additionally semantic queries can be added or one or more of the previously stored and/or listed semantic queries can be removed.

The SQL query generation processing logic 104 generates one or more SQL queries based on the semantic queries stored in the semantic queries database 103. In some embodiments, the SQL query generation processing logic 104 generates and associates therewith a separate SQL query for each semantic query generated. The SQL query generation processing logic 104 stores the generated SQL queries in the SQL queries database 105. Each SQL query includes one or more actions to be implemented with respect to the information provided by the one or more data sources 113 and/or stored in the data storage(s) 112.

As discussed, in some embodiments, the system 100 includes the natural language query generation processing logic 106 and the natural language queries database 107. In such embodiments, the natural language query generation processing logic 106 generates one or more natural language queries for storage in the natural language queries database 107.

The semantic query search processing logic 108 is configured to search for interactions between elements and data of the system 100 based on a natural language query (e.g., the arbitrary natural language query 110) received from the system user 109. The semantic query search processing logic 108 is configured to search the list and/or the semantic queries database 103 and determine the previously-generated semantic query that most closely matches (or is within a reference confidence range) the natural language query 110 received from the system user 109. The semantic query search processing logic 108 is configured to transmit or otherwise provide the semantic query determined to most closely match the received natural language query to the SQL queries database 105. Alternatively, in some embodiments, the semantic query search processing logic 108 is configured to transmit or otherwise provide the determined semantic query to the answer generation processing logic 111 for further processing.

The SQL queries database 105 is configured to identify the SQL query associated with the semantic query received from the semantic query search processing logic 108 (i.e., the semantic query determined to most closely match the natural language query received from the system user 109). As discussed, each SQL query includes or specifies one or more actions to be implemented with respect to the information provided by the data sources(s) 113 and/or stored in the data storage(s) 112. As such, the SQL queries database 105 is configured to execute or implement the one or more actions included in the identified SQL query to retrieve the requested information from the data source(s) 113 and/or the data storage(s) 112.

The answer generation processing logic 111 is configured to provide the system user 109 with the information retrieved from the data source(s) 113 and/or the data storage(s) 112. In some embodiments, the answer generation processing logic 111 formats the retrieved information in a report. It should be appreciated that the answer generation processing logic 111 can also be configured to provide the system user 109 with the retrieved information in any other format (e.g., a natural language answer, a graphic or other visualization, raw data, etc.).

In embodiments in which the semantic query search processing logic 108 is configured to provide the determined semantic query to the answer generation processing logic 111, the answer generation processing logic 111 may be configured to identify the SQL query associated with the semantic query via one or more interactions with the SQL queries database 105. For example, the answer generation processing logic 111 may be configured to query the SQL queries database 105 for the SQL query that is associated with the semantic query received from the semantic query search processing logic 108. In such embodiments, the answer generation processing logic 111 may also be configured to execute or implement the one or more actions included in the identified SQL query to retrieve the requested information from the data source(s) 113 and/or the data storage(s) 112. In some embodiments, the answer generation processing logic 111 may include SQL query identification and execution processing logic 302, a query results receiver 304, and results organization and visualization processing logic 306 (see FIG. 3) to provide all or a portion of this functionality. It should be appreciated that, in some embodiments, the SQL query identification and execution processing logic 302, the query results receiver 304, and/or the results organization and visualization processing logic 306 may be subcomponents of the answer generation processing logic 111. In other embodiments, the SQL query identification and execution processing logic 302, the query results receiver 304, and/or the results organization and visualization processing logic 306 may be components or logic separate from the answer generation processing logic 111.

In embodiments in which the answer generation processing logic 111, or more generally the system 100, includes one or more of the SQL query identification and execution processing logic 302, the query results receiver 304, and the results organization and visualization processing logic 306, the SQL query identification and execution processing logic 302 may be configured to identify, via interactions with the SQL queries database 105, the SQL query associated with the semantic query received from the semantic query search processing logic 108 and execute one or more of the actions included in the identified SQL query. The query results receiver 304 may be configured to receive the results of the SQL query (e.g., the results of the executed actions) from the data storage(s) 112 and/or the data source(s) 113. The results organization and visualization processing logic 306 may be configured to provide the results as an answer to the natural language query 110 of the system user 109. In some embodiments, the results organization and visualization processing logic 306 is configured to format, process, and finalize the results for the system user 109. For example, the results organization and visualization processing logic 306 may be configured to aggregate the results, apply time frames to the results, paginate the results, create relevant visualizations (e.g., charts, graphs, indicators, etc.) of the results, determine particular columns and rows of results to provide, and any other suitable operation for formatting the results based on the needs or preferences of a business or the system user 109.

Figure 2:
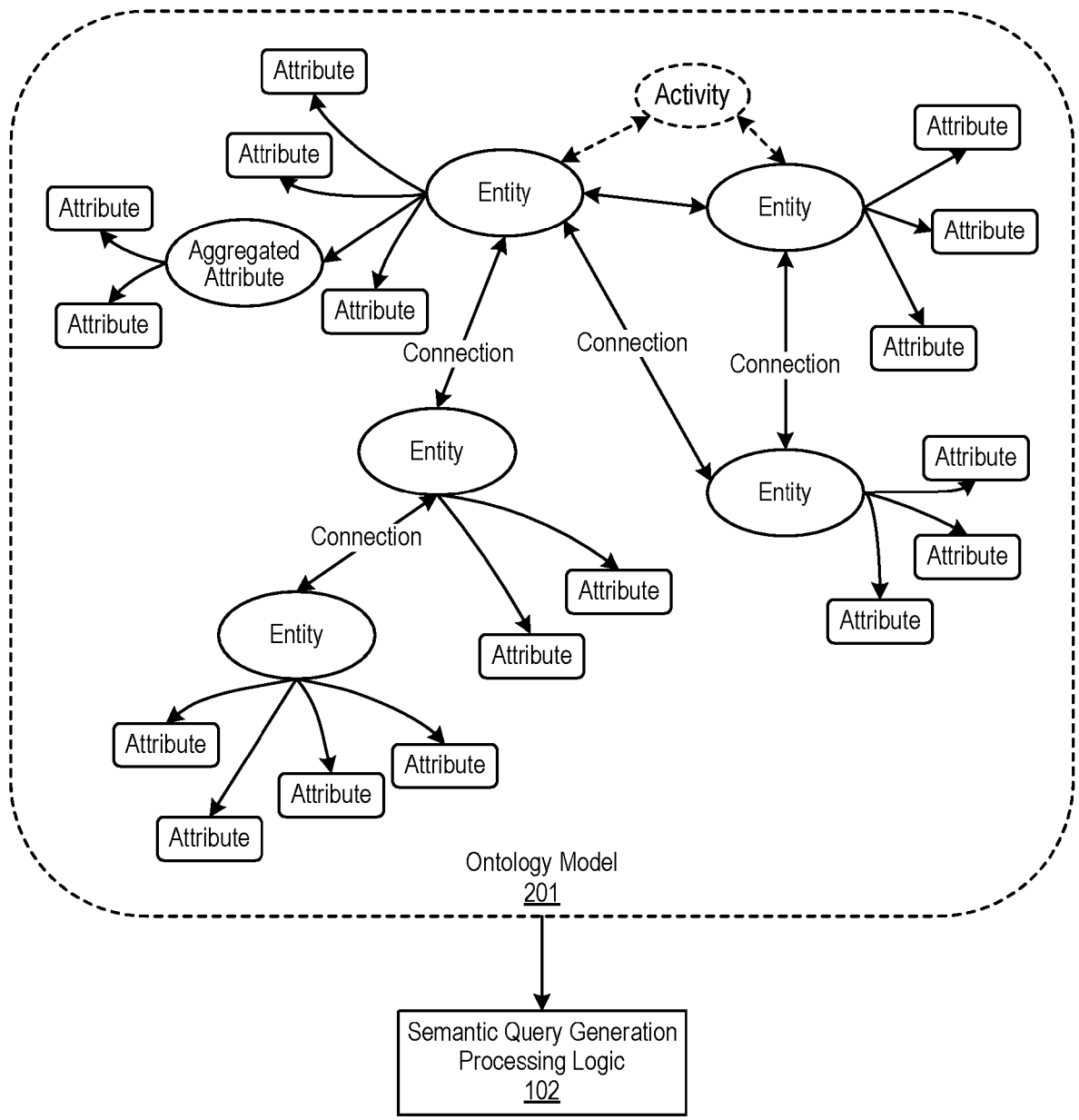
FIG. 2 is a simplified block diagram showing at least one embodiment of an exemplary ontological model that may be used by computing device(s) of the system of FIG. 1 to generate semantic queries for retrieving stored data.

As discussed herein, the ontological model 101 can be based on the structure and semantics of business domain related data and can describe objects, their attributes, and the connections therebetween. FIG. 2 depicts a graphical illustration of an example ontological model 201. It should be appreciated that the ontological model 101 of FIG. 1 may have a substantially similar structure or a different structure than that of the ontological model 201 of FIG. 2. Entities are the key objects of the ontology model 101. They represent key activities or roles of a particular business domain. Attributes are descriptive properties of the entities. An attribute can be a quantitative measurement or dimension. Some attributes can be aggregates (i.e., a combination of multiple attributes). Connections describe types of interrelationships between entities. For example, connections contain information regarding an entity's one-to-one connections, one-to-many connections, or if there is an activity intersecting two or more entities. As discussed, in some embodiments, the ontological model 101 can be set up specifically for a particular project taking into account all the features of business and its domain. Additionally or alternatively, a project can use universal ontological model 101 that contains information about data commonly used in a certain domain.

It should be appreciated that the logic and structure of the ontological model 101 enables the semantic query generation processing logic 102 to generate the plurality of possible semantic queries and/or the list of the plurality of possible semantic queries. The plurality of possible semantic queries and/or the list thereof may be indicative of the natural language queries supported by the system 100. As such, the plurality of possible semantic queries and/or the list thereof may be generated from all possible combinations of data attributes used in the ontological model 101. The system 100 is therefore capable of better understanding the questions proved by system users 109. Unlike legacy approaches and methods utilizing machine learning, the technologies disclosed herein generate a list including only questions/queries meaningful and relevant to a particular business domain. In doing so, the technologies disclosed herein not only answer questions from the system user 109, but they also drive business insights by giving the system user 109 the ability to explore accurate, qualitative reports and visualizations of information from multiple data sources 113 and/or data storages 112.

Figure 3:
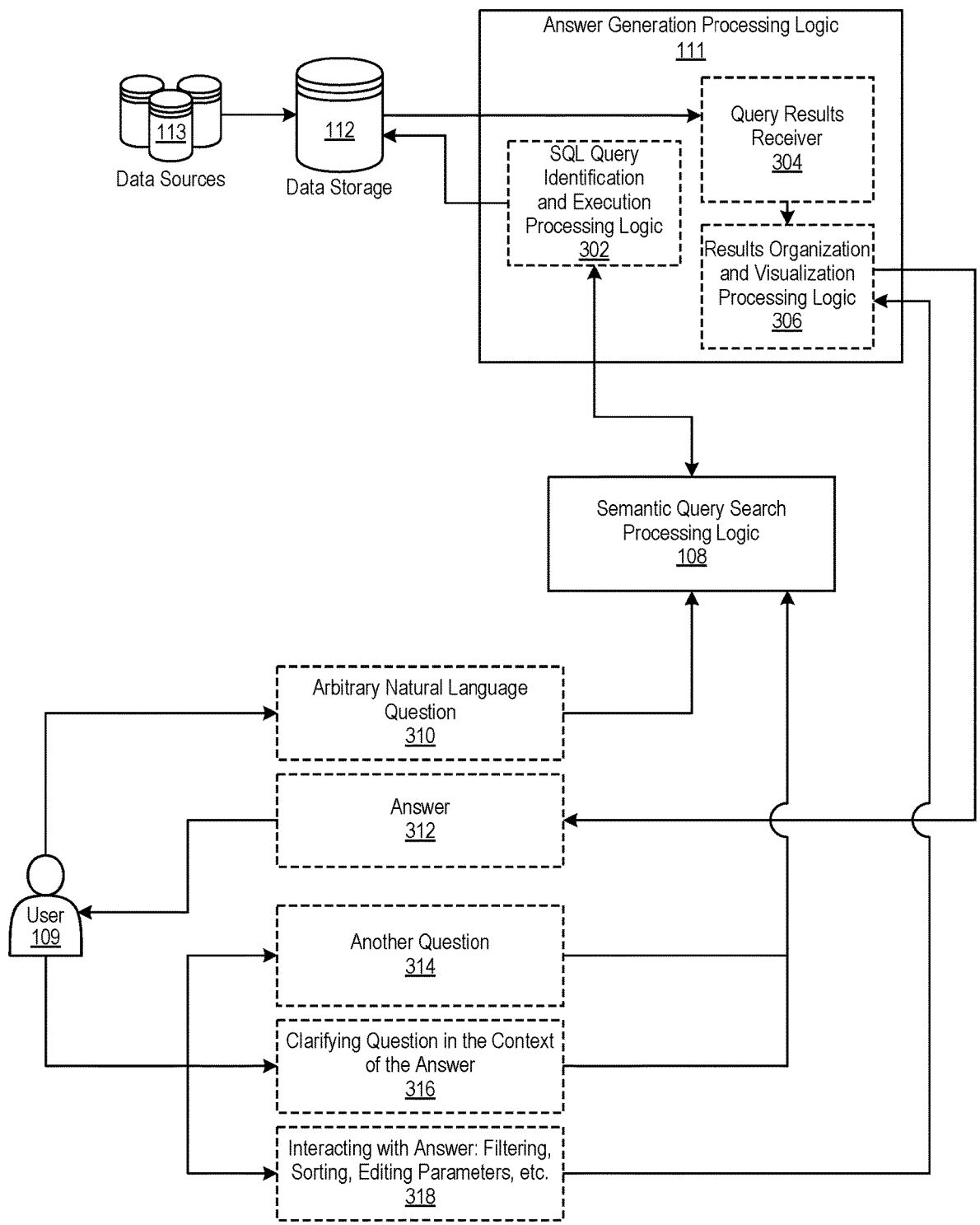
FIG. 3 is a simplified schematic representation of processing natural language queries and providing results data from data source(s) that may be performed by computing device(s) of the system of FIG. 1.

Referring now to FIG. 3, a process for retrieving data from one or more data sources 113 and/or data storages 112 using a natural language queries received from a system user 109 is depicted. The semantic query search processing logic 108 can receive an arbitrary natural language question 310 (i.e., a natural language query 110) from the system user 109. For example, in a multichannel retailer business domain, the natural language question 310 may be "What was the dependency of conversion rate on device category last month?". It should be appreciated that the natural language question 310 may be any other question by the system user 109. In some embodiments, the natural language question 310 may be in the format of text input by the system user 109. Additionally or alternatively, the natural language question 310 may be spoken by the system user 109 and converted into text by one or more components of the system 100.

Subsequently, the semantic query search processing logic 108 recognizes entities and other semantic constructions, for example time periods, included in the natural language question 310. Thereafter, the semantic query search processing logic 108 searches a list or a database of previously-generated semantic queries to determine the previously-generated semantic query that most closely matches (or is within a reference confidence range) the natural language question 310 received from the system user 109. The semantic query search processing logic 108 then provides the semantic query determined to most closely match the received natural language question 310 to the SQL query identification and execution processing logic 302, which as discussed herein, may form part of the answer generation processing logic 111.

Next, the SQL query identification and execution processing logic 302 identifies, via interactions with the SQL queries database 105, the SQL query associated with the semantic query received from the semantic query search processing logic 108 and executes one or more of actions included in the identified SQL query. The identified SQL query, when executed by the SQL query identification and execution processing logic 302, is configured to retrieve information from the data storage(s) 112 and/or the data source(s) 113. The query results receiver 304 of the answer generation processing logic 111 then receives the results of the SQL query (e.g., the results of the executed actions) from the data storage(s) 112 and/or the data source(s) 113.

After the results of the SQL query are received by the query results receiver 304, the results organization and visualization processing logic 306 provides the results of the natural language question 310 as an answer 312 the system user 109. In some embodiments, the results organization and visualization processing logic 306 formats, processes, and finalizes the results to generate the answer 312. For example, the results organization and visualization processing logic 306 aggregates the results, applies time frames to the results, paginates the results, creates relevant visualizations (e.g., charts, graphs, indicators, etc.) of the results, determines particular columns and rows of results to provide, and/or performs any other suitable operation to format the results into the answer 312 based on the needs or preferences of the system user 109.

In some embodiments, the system enables further interactions with the system user 109. For example, after providing the system user 109 with the answer 312 to the natural language question 310, the system 100 may enable the user 109 to ask another question 314. In such cases, the system 100 repeats the process described herein. Additionally or alternatively, the system 100 may enable the user 109 to as a clarifying question 316 related to the previously-provided answer 312. In this case, the system 100 repeats the process described herein but limits the set of questions to the previously-asked natural language question 310. The system 100 may also enable the user 109 to interact 318 with the previously-provided answer 312. For example, the system 100 may enable the user 109 to filter, sort, edit parameters, export, share, and/or interact with the previously-provided answer 312 in any other suitable fashion.

In some embodiments, the system 100 utilizes a business domain model to form the ontological model 101 for subsequent generation of the possible semantic queries or questions supported. For example, in some embodiments, the system 100 may utilize a business domain model 400 such as the one illustratively shown in FIG. 4 to generate one or more ontological models 101. The business domain model 400 may include information collected by a business about a target user 401 (e.g., a consumer, a visitor, etc.). For example, the business domain model 400 may include geographical information 402 indicative of the locations (online or offline) at which the target user interacts with a store, or more generally, the business. The business domain model 400 may also include device information 406 indicative of the devices used by the target user 401 to interact online with the business. Each online or offline interaction may occur via one or more touchpoints 422 (e.g., a website, a social media platform, an offline brick-and-mortar store, etc.). In some embodiments, sequences of online and/or offline interactions are used by the system 100 to develop sessions 420. Each session 420 may be associated with one or more parameters such as, for example, one or more traffic sources 424. In some embodiments, each touchpoint 422 may be associated with one or more objects with which the target user 401 interacts. For example, each touchpoint 422 may be associated with one or more objects corresponding to the products 440 offered by a store, webpage objects 450 viewable by the target user 401 (or other visitors), event objects 460, user transaction objects 470 (e.g., actions performed by the target user 401), promotion objects 480, and/or social objects 490 (e.g., targeted marketing and social stimuli, etc.).

As discussed herein, the ontological models 101 used by the system 100 describes various objects of the business domain model, their attributes, and any connections therebetween. In some embodiments, the ontological models 101 used by the system 100 include information representative of one or more entities, information representative of one or more attributes of each object, and information representative of one or more connections between various entities and/or attributes. The entities of the ontological models 101 represent the key activities or roles of a particular business domain (e.g., the 'objects' of the business domain model 400). The attributes are descriptive properties of the entities (e.g., quantitative measurements or dimensions of the 'objects'). The connections describe the types of interrelationships between entities.

Figure 4:
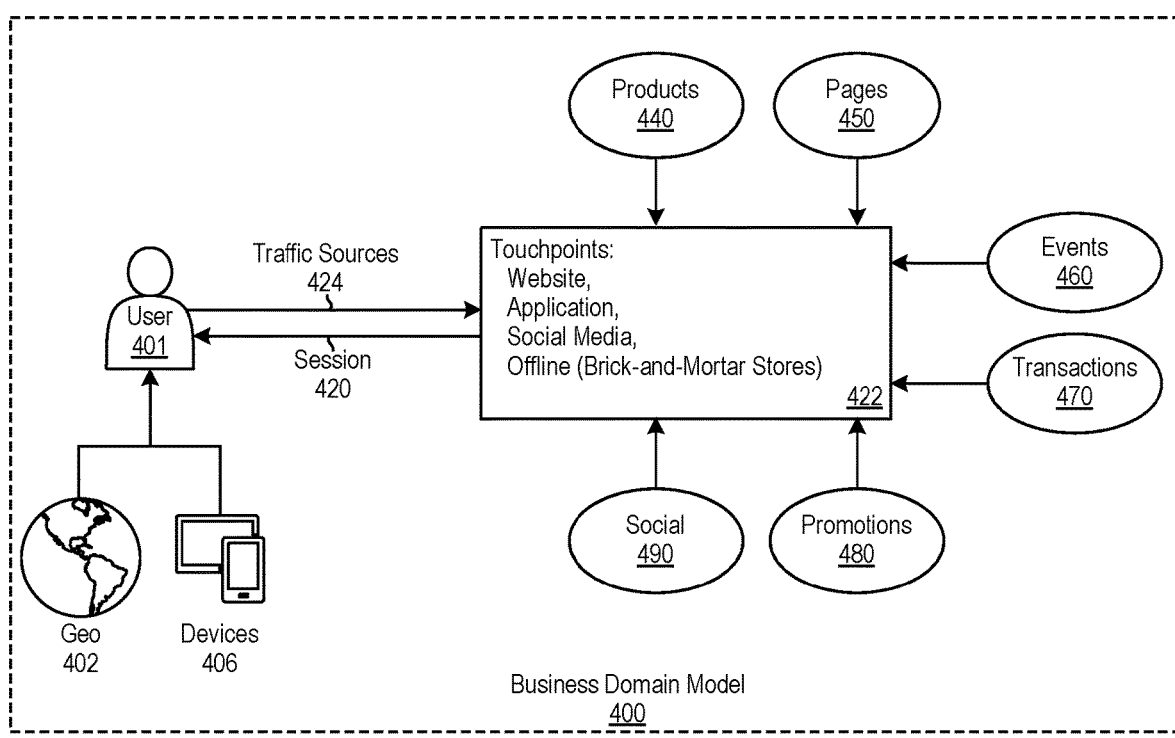
FIG. 4 is a simplified block diagram showing at least one embodiment of an exemplary business domain model.
Figure 5:
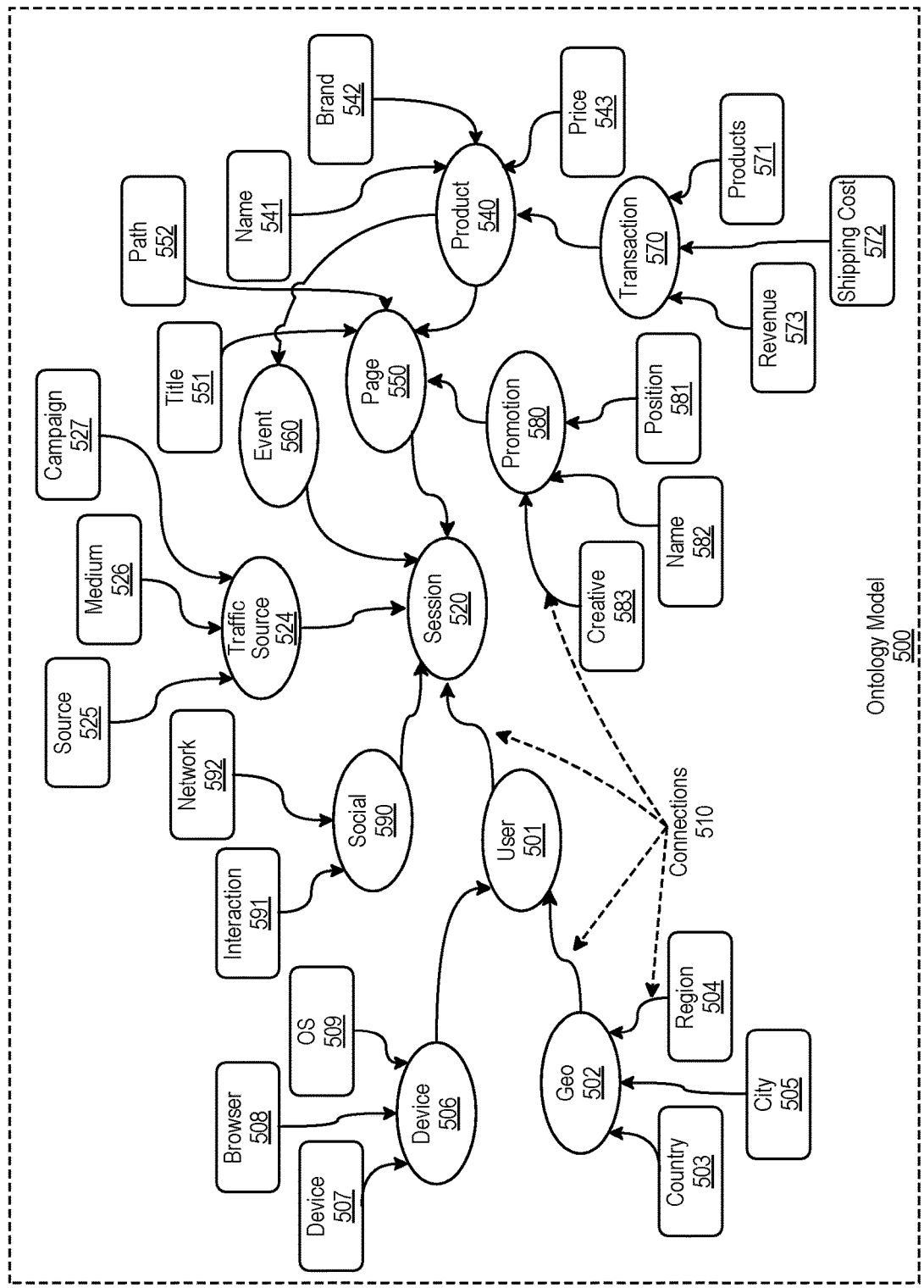
FIG. 5 is a simplified block diagram showing at least one additional embodiment of an ontological model based on the exemplary business domain model of FIG. 4.

By way of example, the illustrative business domain model 400 depicted in FIG. 4 can be used to form or develop the illustrative ontological model 500 depicted in FIG. 5. In that way, the illustrative ontological model 500 may be a visual representation of the business domain model 400 of FIG. 4. For example, the ontological model 500 includes multiple entities (e.g., user 501, geo 502, device 506, session 520, traffic source 524, product 540, page 550, event 560, transaction 570, promotion 580, and social 590), each of which corresponds to a different object of the business domain model 400. Various entities of the ontological model 500 include one or more attributes associated therewith. For example, the geo entity 502 includes a country attribute 503, a region attribute 504, and a city attribute 505. The device 506 entity includes a device attribute 507, a browser attribute 508, and an OS attribute 509. The social entity 590 includes an interaction attribute 591 and a network attribute 592. The traffic source entity 524 includes a source attribute 525, a medium attribute 526, and a campaign attribute 527. The product entity 540 includes a name attribute 541, a brand attribute 542, a price attribute 543. The page entity 550 includes a title attribute 551 and a path attribute 552. The transaction entity 570 includes a products attribute 571, a shipping costs attribute 572, and a revenue attribute 573. The promotion entity 580 includes a position attribute 581, a name attribute 582, and a creative attribute 583. It should be appreciated that these attributes may be one or more dimensions and/or metrics that describe or are indicative of the entities (e.g., the 'objects' of the business domain model 400). The connections 510 of the ontological model 500 define the relationships and dependencies between the entities and their corresponding attributes. It should be appreciated that although the illustrative business domain model 400 and the illustrative ontological model 500 depicted in FIGS. 4 and 5 are representative of a omnichannel business, similar or different business domain models and/or ontological models representative of other types of business or entities may also be used.

Continuing the previous example, the system 100 can utilize the ontological model 500 to generate a list of the questions it is capable of answering and generating visualizations. For example, based at least in part on the entities, attributes, and connections of the ontological model 500, the system 100 may be configured answer the following illustrative question: "What is the revenue distribution by product brands?" To do so, the system 100 may be configured to take into account that since the transaction entity 570 is connected to the product entity 540, the revenue attribute 573 is connected to the brand 542. As a result, the system 100 may be configured to determine that the revenue can be grouped by brands. In response to such a determination, the system 100 can generate one or more semantic queries and/or SQL queries for answering the illustrative question. In another example, using the ontological model 500, the system 100 may also be configured answer the following illustrative question: "What cities were the visitors from during last 30 days?" In this case, the system 100 may be configured to determine that since the user entity 501 is connected to the geo entity 502, an aggregated number of visitors (users) can be grouped by any of the attributes of the geo entity 502 (e.g., the country attribute 503, the region attribute 504, or the city attribute 505). In response to such a determination, the system 100 can generate one or more semantic queries and/or SQL queries for answering the illustrative question. Continuing with these examples, using the ontological model 500, the system 100 may not be able to answer the following question: "What product brand were the visitors from?" This is because the brand attribute 542 of the product entity 540 is not connected the user entity 501.

Using the technologies disclosed herein, the system 100 is capable of supporting natural language questions of any form received by system users 109. For example, in some embodiments, a system user 109 may format questions according to one or more of the following question templates: "trendline of <metric> by <dimension>", "distribution of <metric> by <dimension>", "distribution of <metric> by <dimension>", etc. It should be appreciated that ontological models 101 used by the system 100 can be expanded by adding new entities (e.g., business domain objects), attributes, and/or connections therebetween. Additionally or alternatively, the ontological models 101 used by the system 100 can be expanded by aggregating existing attributes to form a new attribute or value (e.g., aggregating the sum of the transaction revenue attributes 573 and the total number of transactions 570 to form an average order value). Additionally or alternatively, the ontological models 101 used by the system 100 can be expanded by implementing support of new semantic constructions (e.g., adding additional question templates).

Figure 6:
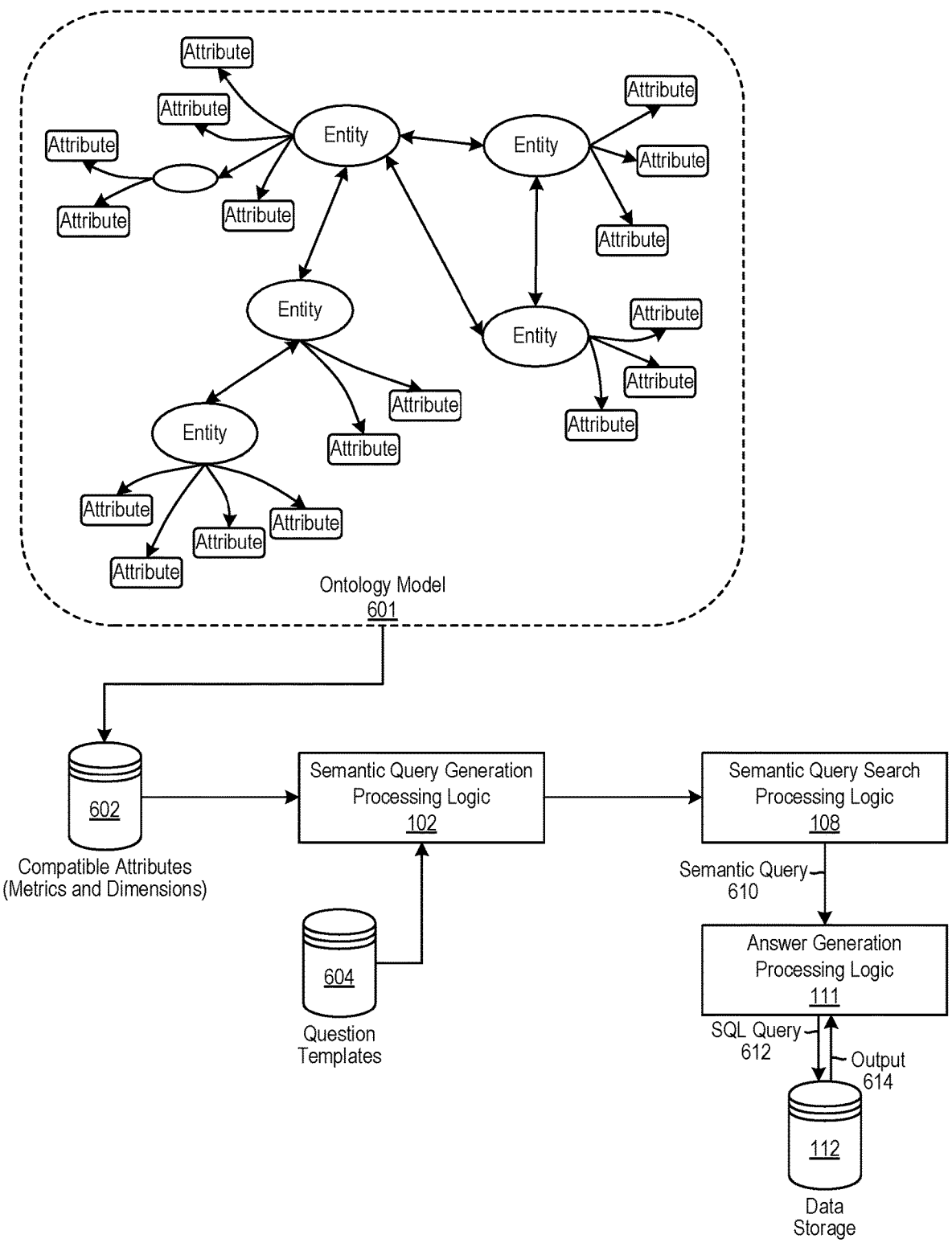
FIG. 6 is a simplified schematic representation of generating semantic queries and retrieving stored data in response to natural language queries that may be performed by computing device(s) of FIG. 1.

Referring now to FIG. 6, a process for generating semantic queries and retrieving stored data in response to natural language queries is depicted. The ontological model 601 represents a particular business domain data model. It consists of entities (e.g., business domain objects), their attributes, and the relationships therebetween. The attributes may be embodied as metrics or any other quantitative properties of the entities. Additionally or alternatively, the attributes may be embodied as dimensions or any other qualitative properties of the entities. Using the ontological model 601, the system 100 may determine a set of compatible attributes (metrics and dimensions) 602. Two or more attributes may be determined by the system 100 to be compatible if the combination thereof is meaningful and relevant within a business domain. For example, in an online retail domain, the combination of revenue (metric) and website page (dimension) is not meaningful in the context of metric distribution by dimension. However, a distribution of revenues or costs (metrics) by traffic sources or cities (dimensions) s meaningful in the online retail domain. Additionally, a trendline of conversion rates (metric) split by product categories or landing pages (dimensions) is meaningful in the online retail domain.

As discussed, the system 100 (i.e., the semantic query generation processing logic 102) may also use one or more question templates 604 to facilitate generation of the semantic queries. The question templates 604 may be schematic representations of element dependencies of the ontological model 601. For example, a question template 604 may have one of the following formats: "dependence of <metric> on <dimension> [and <dimension>]"; "trendline of <metric> change [by <dimension>]"; "distribution of <metric> by <dimension> [and <dimension>]"; and "number of <attribute> occurrences". Based at least in part on the set of compatible attributes 602 and/or the question templates 604, the semantic query generation processing logic 102 generates the possible semantic queries and/or the list of the possible semantic queries. For example, using the set of compatible attributes 602 and/or the question templates 604, the semantic query generation processing logic 102 may generate one or more or a list of the following semantic queries: "dependence of conversion on device category"; "trendline of revenue change by advertisement campaigns"; "distribution of advertising costs by traffic sources and user types"; and "number of visits".

Subsequently, in response to receiving a natural language query 110 from a system user 109, the semantic query search processing logic 108 identifies the previously-generated semantic query that most closely matches, or is within a reference confidence range of, the natural language query 110 received from the system user 109. The identified semantic query 610 is provided to the answer generation processing logic 111 by the semantic query search processing logic 108. The answer generation processing logic 111 then identifies the SQL query associated with the semantic query via one or more interactions with the SQL queries database 105. Thereafter, the answer generation processing logic 111 provides the corresponding SQL query 612 to the data storage(s) 112 for retrieval of the requested information. The data storage(s) 112 provides raw, unformatted output data 614 to the answer generation processing logic 111 in response to the SQL query 612. In some embodiments, the answer generation processing logic 111 processes the raw, unformatted output data 614. In such embodiments, embodiments, the answer generation processing logic 111 transforms the raw, unformatted output data 614 into a response to the natural language query 110 received from the system user 109. To do so, in some embodiments, the answer generation processing logic 111 may aggregate the output data 614, apply time frames to the output data 614, paginate the output data 614, create relevant visualizations (e.g., charts, graphs, indicators, etc.) of the output data 614, determine particular columns and rows of output data 614 to provide, and any other suitable operation for formatting the output data 614 based on the needs or preferences of the system user 109 and/or of a business.

Figure 7:
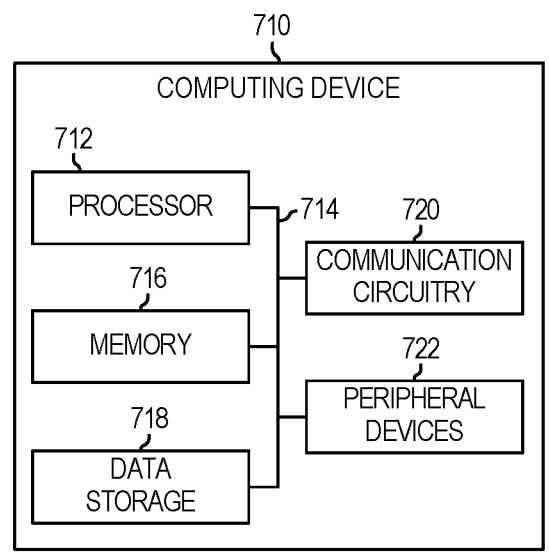
FIG. 7 is a simplified block diagram showing at least one embodiment of an exemplary computing device of the system of FIG. 1.

The processes described herein can be performed on or between one or more computing devices that are specially configured to perform the processing described herein. Referring now to FIG. 7, an example computing device 710 is presented. The computing device 710 can be embodied as any type of computing device or server capable of processing, communicating, storing, maintaining, and transferring data. For example, the computing device 710 can be embodied as a microcomputer, a minicomputer, a custom chip, an embedded processing device, a mobile computing device, a laptop computer, a handheld computer, a smart phone, a tablet computer, a personal digital assistant, a telephony device, a desktop computer, a mainframe, or other computing device and/or suitable programmable device. In some embodiments, the computing device 710 can be embodied as a computing device integrated with other systems or subsystems. As illustratively shown, the computing device 710 includes a processor 712, a system bus 714, a memory 716, a data storage 718, communication circuitry 720, and one or more peripheral devices 722. Of course, the computing device 710 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 716, or portions thereof, can be incorporated in the processor 712 in some embodiments. Furthermore, it should be appreciated that the computing device 710 can include other components, sub-components, and devices commonly found in a computer and/or computing device, which are not illustrated in FIG. 7 for clarity of the description.

The processor 712 can be embodied as any type of processor capable of performing the functions described herein. For example, the processor 712 can be embodied as a single or multi-core processor, a digital signal processor, a microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or any other type of processor or processing/controlling circuit or controller.

In various configurations, the computing device 710 includes a system bus 714 for interconnecting the various components of the computing device 710. The system bus 714 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 712, the memory 716, and other components of the computing device 710. In some embodiments, the computing device 710 can be integrated into one or more chips such as a programmable logic device or an application specific integrated circuit (ASIC). In such embodiments, the system bus 714 can form a portion of a system-on-a-chip (SoC) and be incorporated, along with the processor 712, the memory 716, and other components of the computing device 710, on a single integrated circuit chip.

The memory 716 can be embodied as any type of volatile or non-volatile memory or data storage capable of performing the functions described herein. For example, the memory 716 can be embodied as read only memory (ROM), random access memory (RAM), cache memory associated with the processor 712, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 716 can store various data and software used during operation of the computing device 710 such as operating systems, applications, programs, libraries, and drivers.

The data storage 718 can be embodied as any type of device or devices configured for short-term or long-term storage of data such as, for example, memory devices and circuits, memory cards, hard disk drives, solid-state drives, or other data storage devices. For example, in some embodiments, the data storage 718 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 712, or the memory 716 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 720 of the computing device 710 may be embodied as any type of communication circuit, device, interface, or collection thereof, capable of enabling communications between the computing device 710 and/or any other computing devices communicatively coupled thereto. For example, the communication circuitry 720 may be embodied as one or more network interface controllers (NICs), in some embodiments. The communication circuitry 720 may be configured to use any one or more communication technologies (e.g., wireless or wired communications) and associated protocols (e.g., Ethernet, Wi-Fi®, WiMAX, etc.) to effect such communication.

In some embodiments, the computing device 710 and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100.

Additionally, in some embodiments, the computing device 710 can further include one or more peripheral devices 722. Such peripheral devices 722 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A system for enabling retrieval of stored information in response to a user selection from pre-generated natural language queries, the system comprising:
   an ontological model that describes a business domain associated with a user, wherein the ontological model is stored in a database;
   a set of question templates that describes dependencies between elements of the ontological model, wherein the set of question templates is stored in the database;
   an information retrieval server comprising a processor executing instructions stored in memory, wherein the instructions cause the processor to, prior to receiving the user selection from a user:
      determine a set of compatible attributes within the business domain based on the ontological model;
      generate, using a semantic query generation processing logic, a plurality of semantic queries based on the set of compatible attributes and the set of question templates, and store the plurality of semantic queries in a semantic queries database;
      generate, using a structured query generation processing logic, a plurality of Structured Query Language (SQL) queries based on the plurality of semantic queries, and store the plurality of SQL queries in a SQL queries database;
      associate each of the plurality of semantic queries with a corresponding SQL query of the plurality of SQL queries;
      generate, using a natural language query generation processing logic, a plurality of natural language queries based on the plurality of semantic queries, and store the plurality of natural language queries in a natural language queries database;
      associate each of the plurality of semantic queries with a corresponding natural language query of the plurality of natural language queries; and
   wherein the instruction cause the processor to, when receiving the user selection:
      display the plurality of natural language queries to the user;
      identify a natural language query of displayed the plurality of natural language queries that corresponds to the user selection, the natural language query indicative of a request for information by the user;
      identify a semantic query of the plurality of semantic queries that corresponds to the natural language query;
      identify a SQL query of the plurality of SQL queries that corresponds to the semantic query;
      retrieve the information requested by the user as a function of the identified SQL query; and
      present the retrieved information to the user.

2. The system of claim 1, wherein the plurality of semantic queries includes every possible semantic query that both includes compatible attributes, and that complies with a question template of the set of question templates.

3. The system of claim 2, wherein the plurality of semantic queries, which includes every possible semantic query from the ontological model, is indicative of all possible natural language queries supported by the ontological model, and wherein the generated plurality of natural language queries includes all possible natural language queries supported by the ontological model.

* * * * *